United States Patent [19]
Johnson et al.

[11] Patent Number: 6,163,016
[45] Date of Patent: Dec. 19, 2000

[54] HEATER CLAMP

[75] Inventors: J. Evan Johnson, Eden Prairie; Eric Carl Branwall, Burnsville, both of Minn.

[73] Assignee: Thermetic Products, Inc., St. Louis Park, Minn.

[21] Appl. No.: 09/421,604

[22] Filed: Oct. 20, 1999

Related U.S. Application Data

[60] Provisional application No. 60/104,925, Oct. 20, 1998.

[51] Int. Cl.⁷ .............................. H05B 3/40; B29C 45/20
[52] U.S. Cl. .................. 219/424; 219/535; 219/536; 219/549; 425/549; 24/25; 24/20 R
[58] Field of Search .................................. 219/424, 426, 219/521, 534, 536, 544, 546, 548, 549; 425/549; 222/146.5; 24/19, 25, 268, 269, 225, 276, 277

[56] References Cited

U.S. PATENT DOCUMENTS

| | | |
|---|---|---|
| 4,563,795 | 1/1986 | Fournier . |
| 4,859,176 | 8/1989 | Meyer . |
| 4,968,247 | 11/1990 | Olson . |
| 5,133,655 | 7/1992 | Schad et al. . |
| 5,230,911 | 7/1993 | Glaesener et al. . |
| 5,263,230 | 11/1993 | Johnson . |
| 5,360,333 | 11/1994 | Schmidt . |
| 5,411,392 | 5/1995 | Buren ..................................... 425/549 |
| 5,558,888 | 9/1996 | Beck ...................................... 425/549 |
| 5,591,367 | 1/1997 | Schwarzkopf .......................... 219/544 |
| 5,820,900 | 10/1998 | McGrevy . |
| 6,025,577 | 2/2000 | Schwarzkopf .......................... 219/534 |
| 6,054,691 | 4/2000 | McGwire ............................... 219/544 |

*Primary Examiner*—Joseph Pelham
*Attorney, Agent, or Firm*—Douglas J. Christensen

[57] ABSTRACT

A low profile heater for plastic injection molding equipment nozzles utilizes forces provided to the axially ends of a tube portion to radially compress the tube portion onto a coiled heater element thereby compressing the heater element radially inward for optimal heat conduction between said heater element and the nozzle onto which the heater is attached. Further embodiments uses a base sleeve onto which the coiled heater element is placed to engage the nozzle. The base sleeve may utilize a tapered threaded portion with slits in the sleeve to allow tightening of a ring portion to radially compress the sleeve base onto the nozzle.

15 Claims, 5 Drawing Sheets

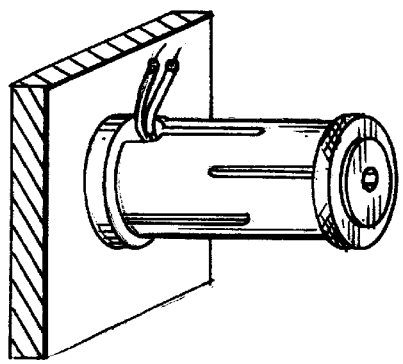
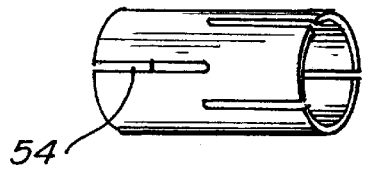
Fig. 6.
Fig. 7.
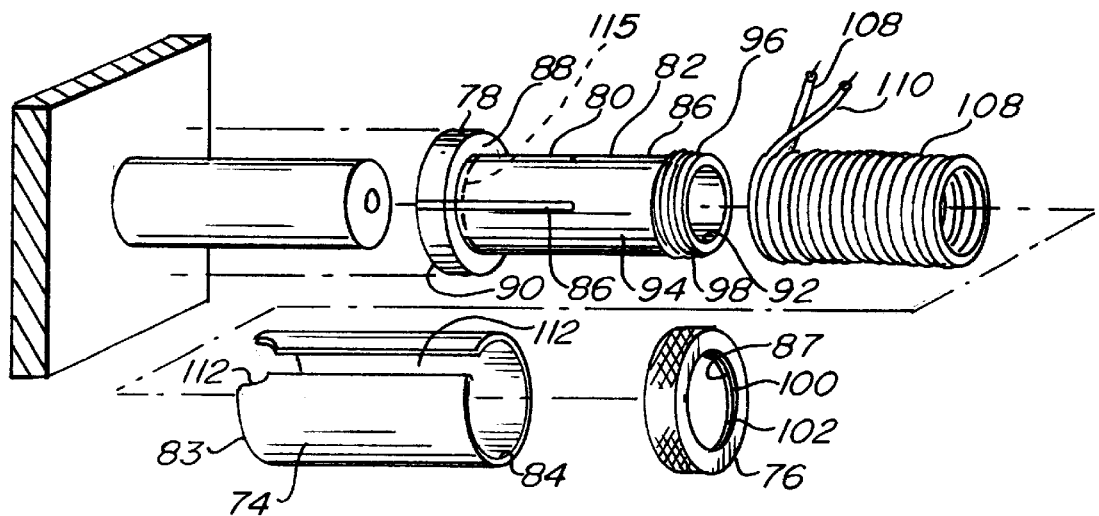
Fig. 8.
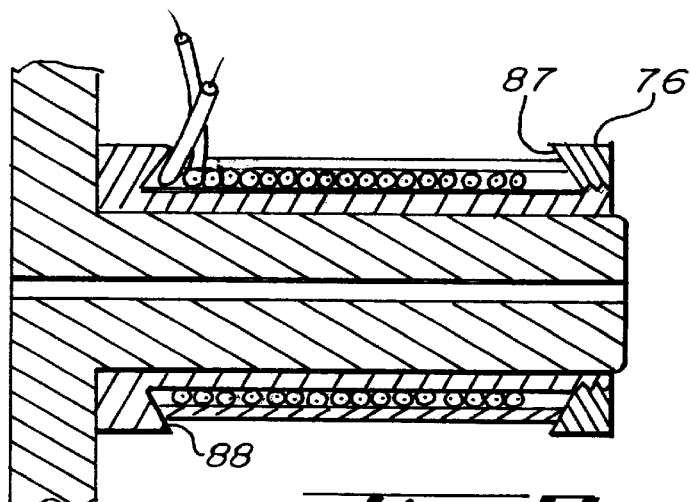
Fig. 9.

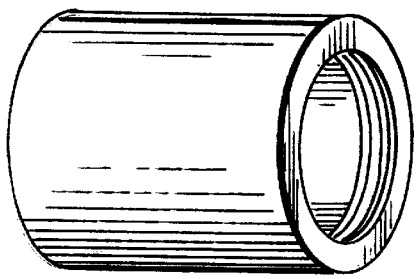
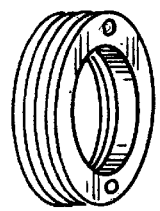
*Fig. 15.*  *Fig. 16.*  *Fig. 17.*
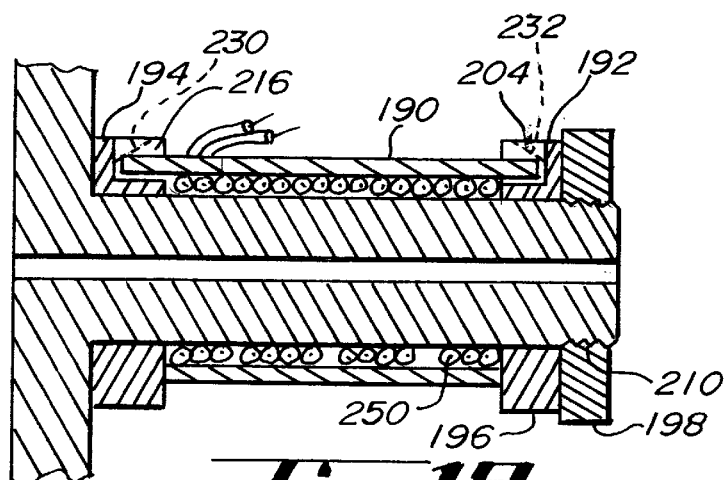
*Fig. 18.*
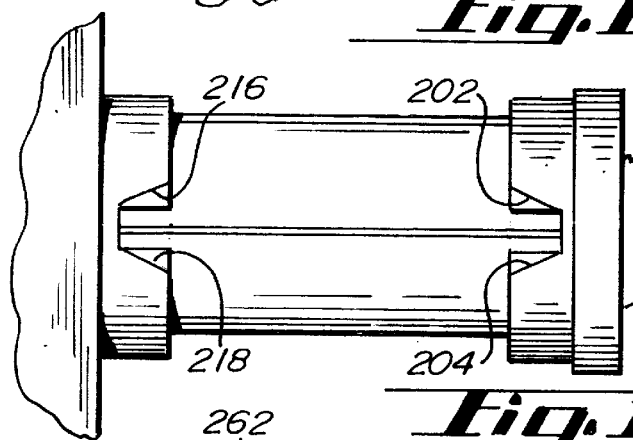
*Fig. 19.*
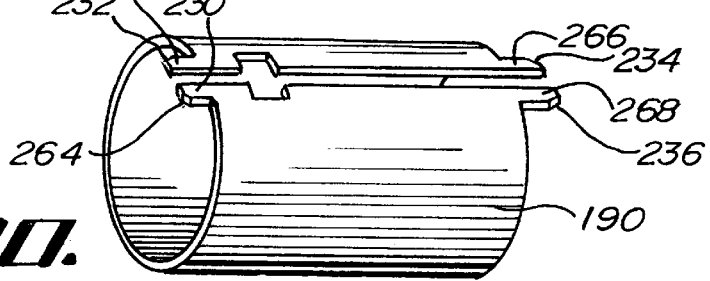
*Fig. 20.*

HEATER CLAMP

This application is based on U.S. Provisional Patent Application Ser. No. 60/104,925 filed Oct. 20, 1998.

BACKGROUND OF THE INVENTION

Field of the Invention

This invention relates to electric heaters. More specifically, the invention relates to coiled heaters for nozzles on plastic injection molding equipment.

Plastic injection molding utilizes steel molds which are separable and have cavities into which molten plastic resin is injected under pressure. Often nozzles, which are utilized to inject the plastic resin into the mold cavities or in ducts leading to the cavities, must have supplemental heating to properly control the molten resin temperature as it is injected into the cavity. The supplemental heating may be provided by electric heaters placed on or at the nozzles. Such heaters will typically consist of a heater wire supported by insulative material contained within a length of metallic tubular sheath. The metallic tubular sheath may be wound into a coil which is secured to the nozzle. The coiled sheath containing the heater element wire is then contained within a housing or clamp and is secured to the nozzle.

For purposes of heat transfer from the heater to the nozzle, it is advantageous to provide radial compression between the heater and the nozzle. Prior art heaters have, for example, utilized outer tubes with an axial slit to secure the coiled tubular sheaths directly to the nozzle. Such clamps, as illustrated in U.S. Pat. No. 5,263,230 owned by the assignee of this application, utilize mechanisms to generate a tangential pulling force on the tube across the slit thereby reducing the diameter or the tubular shaped clamp and thereby radially compressing the coiled sheaths onto the nozzle. See also, U.S. Pat. No. 4,563,795 for a different tightening mechanism. Although these types of clamps work exceedingly well in many applications, it is at times desirable to have a heater with a minimal diametric cross-section. The mechanisms utilized to create the tangential pulling force extend radially outward from the heater clamp. In some applications it would be desirable to have the minimum possible cross sectional profile while still providing radial compression of coiled metallic sheath.

Other known clamps utilize an inner housing and outer housing with the coiled tubular sheaths intermediate said inner and outer housing. Such clamps have not heretofore provided effective radial compression of the coiled metallic sheath directly onto the nozzle or compression of the coiled metallic sheath on an inner by way of an actuatable clamping mechanism.

SUMMARY OF THE INVENTION

A heater clamp provides a radial compression of a coiled metallic sheath by way of providing axial force which acts exclusively on the ends of a slit tube extending coaxially around the coiled metallic sheath. In a preferred embodiment, a threaded ring, with a conical surface acts to force the sheath radially inward as the ring is tightened toward the slit tube. In another embodiment an inner tube with a slit has the coiled metallic sheath wrapped therearound and has a slightly conically shaped threaded portion such that as a nut is tightened thereon, the inner tube is radially compressed to engage with the nozzle.

An object and advantage of a preferred embodiment of the invention is that an extremely low radial profile is provided while also providing an active clamping effect on the coiled metallic sheath radially inward toward the nozzle.

Another object and advantage of a preferred embodiment of the invention is that active radial compression is provided with a very simple mechanism that is easy to manufacture and operate.

Another object and advantage of the invention is that the active clamping is provided by operation of a nut which is located proximate the tip of the nozzle thereby providing easy accessibility.

Another object and advantage of a preferred embodiment of the invention is that active radial compression of an inner tube which is engaged by the coiled metallic sheath may be provided.

BRIEF DESCRIPTION OF THE DRAWINGS

FIG. 6 is a perspective view of an alternative embodiment of the tube portion.

FIG. 7 is a perspective view of one embodiment of the invention utilizing a tube portion with multiple slits.

FIG. 8 is an exploded perspective view of a further embodiment of the invention utilizing a base sleeve.

FIG. 9 is a cross-sectional view of the embodiment of FIG. 8.

FIG. 15 is an opposite perspective view of the base sleeve suitable for use in the embodiments of FIG. 12 or FIG. 10.

FIG. 16 is a perspective view of the first ring portion suitable for use with the embodiment of FIG. 12.

FIG. 17 is a cross-sectional view of the first ring portion shown in FIG. 16 and FIG. 12.

FIG. 18 is a cross-sectional view of a further embodiment of the invention.

FIG. 19 is a top plan view of the embodiment shown in FIG. 18.

FIG. 20 is a perspective view of the tube portion of the embodiment of FIGS. 18 and 19.

DETAILED DESCRIPTION OF PREFERRED EMBODIMENTS

Figure 2:
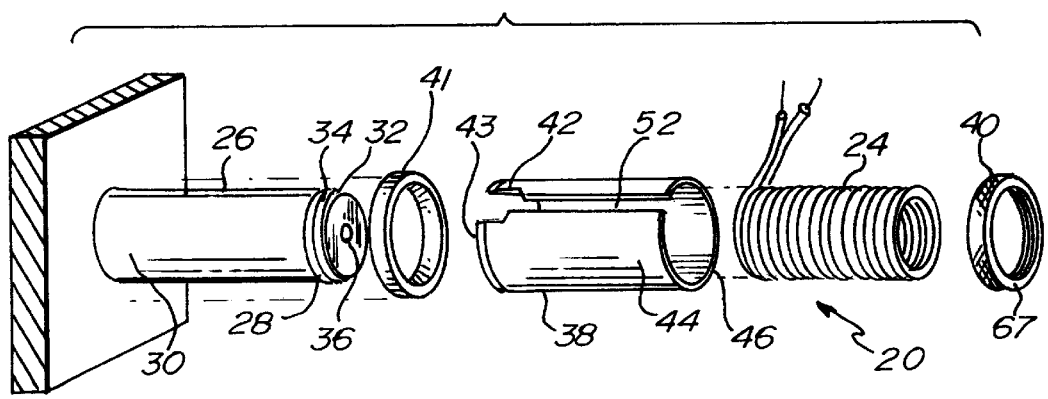
FIG. 2 is a blown-up perspective view of the embodiment of FIG. 1.
Figure 1:
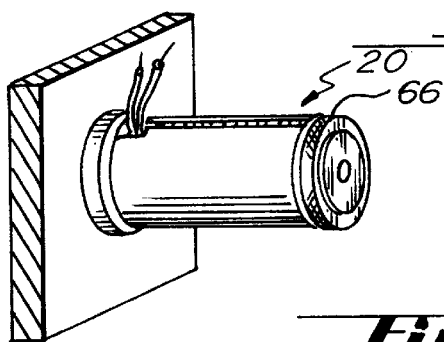
FIG. 1 is a perspective view of an embodiment of the invention on an injection mold nozzle.

The figures illustrate several means for radially compressing inward a slit cylindrical tube. Referring to FIGS. 1 and 2, a preferred embodiment of the invention configured as a heater clamp is shown and is designated with the numeral 20. The heater clamp functions to radially compress a coiled heater element 24 onto a plastic injection molding nozzle 26. The nozzle 26 is generally cylindrical in shape and has a tip end 28, a base end 30, threads 32 on a threaded portion 34 and a duct 36 for the passage of molten plastic resin.

Figure 3:
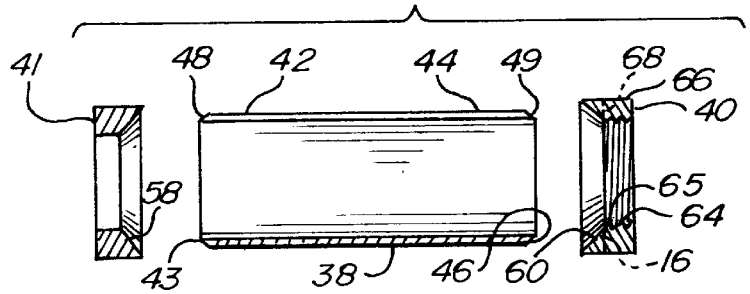
FIG. 3 is a cross-sectional view of the sleeve, the first ring portion, and the second ring portion of the embodiment of FIGS. 1 and 2.
Figure 4:
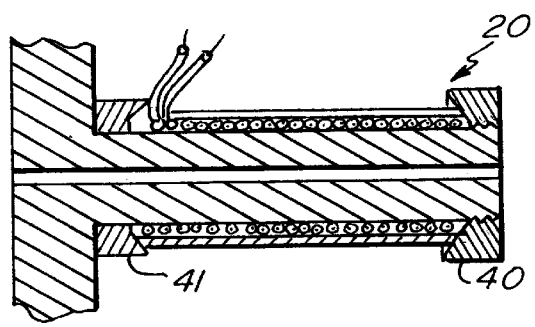
FIG. 4 is a cross-sectional view of the embodiment of FIGS. 1 and 2.

The heater clamp 20 principally comprises a tube portion 38, first collar or ring portion 40 and a second collar or ring portion 41. Tube portion 38 has a first end 42, a first end edge 43, a second end 44, and a second end edge 46. As shown in FIG. 3, the end edges 43, 46 may have ramps or tapered surfaces 48, 49. As shown in FIG. 2 and FIG. 6 the tube portion may have a single slit 52 extending from first end edge to the second end edge or a plurality of slits 54 each of which extend only partially the distance.

Figure 5:
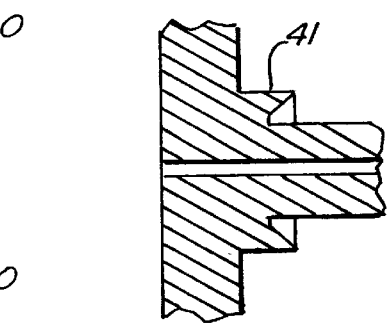
FIG. 5 is the cross-sectional view similar to that of FIG. 4 showing an alternative embodiment of the second ring portion.

Referring specifically to FIGS. 2, 3, 4, and 5, the collar or ring portions 40, 41 have tapered surfaces 58, 60 which angle inwardly towards the intermediate portion of the tube portion and the nozzle. Additionally, the second ring portion 41 has a threaded portion 64 which has internal threads 65, and a exterior surface 66 which will typically include a gripping portion such as a knurled surface 66 or recesses 67 or a hex head 68. The second ring portion 41 may be integral with the nozzle and/or base as illustrated in FIG. 5.

This embodiment operates as follows: The second ring portion is positioned at the base end of the nozzle. If the ring portion is not already integral with said nozzle. The coiled heater element 24 is placed on said nozzle with the tube portion 38 substantially covering said coiled heater element. The first ring portion 40 is engaged with the threads on the tip end of the nozzle. The first edge 43 of the tube portion is engaged with the ramp surface 58 of the second ring portion and the second end edge 46 of said tube portion is engaged with the ramp surface 60 of the first ring portion. The first ring portion is rotated while engaged with the threaded portion of the nozzle thereby causing the diameter of the tube portion to be reduced as the tube portion and edges 48, 49 follow the ramps 58, 60 radially inward. As the tube portion is thus compressed the heater element coil 24 is correspondingly compressed onto the exterior surface of the nozzle.

Referring to FIGS. 6, 7, 8, and 9, an alternate embodiment of the invention is portrayed and comprises a tube portion 74, a first ring portion 76, and a second ring portion 78, and a base sleeve portion 80. In the embodiment shown in FIG. 7, the second ring portion 78 is integral with the base sleeve portion 80 to form the base sleeve 82. The tube portion has a first end 83 and a second end 84. The first ring portion 76 and second ring portion 78 have respective ramp surfaces 87, 88. Said base sleeve has slots 86 extending from a first end 90 and a second end 92 into the intermediate portion 94.

This embodiment can be utilized on the same nozzle configuration as shown in the embodiment of FIGS. 1 and 2, although the threaded portion 34 of the nozzle, if present, would not be utilized. Rather the base sleeve portion 80 has at least one threaded portion 96 for receiving the first ring portion 76 which has a threaded portion 100 with threads 102. The tube portion 74 which compresses the coiled heater element 108 may have a single slit 112 or multiple slits as shown in FIG. 6. Similarly, the base sleeve portion can have a single slit extending from the first end 90 to the second end 92 or a plurality of slits extending from one or both ends terminating in the intermediate portion of the base sleeve portion. Note as shown best in FIGS. 8 and 9, the threaded portion 96 is tapered such that when the first ring portion 76 is tightened thereupon said base sleeve portion is compressed. Note that the second ring portion 78 may also be a distinct component from the base sleeve portion with the base sleeve portion having a second threaded portion as illustrated by the dotted line with the numeral 115 on FIG. 8. In such a configuration, the second ring portion could be essentially identical to the first ring portion 76, that is without the additional slit 86 which is shown extending through said ring portion.

This embodiment functions as follows: the coiled heater element 108 is positioned on the base sleeve portion 80 with the slit tube portion 74 extending over same. The first ring portion 76 is engaged with the threaded portion 98 and is tightened while engaging the first end and second end of the tube portion. Further tightening of the ring portion 76 causes the first end and second end of the tube portion 74 to follow the ramp surfaces 87, 88 thereby reducing the diameter of the tube portion 74 thereby radially compressing the heater coil element 108. Simultaneously the tightening of the first ring portion onto the threaded portion of the base sleeve causes the compression of the diameter of said base sleeve thereby tightening, securing, and compressing said base sleeve portion and the entire heater unit onto the nozzle. The lead wires 108, 110 of the coiled heater element extend out an appropriately sized recessed 112 in the tube portion.

Note that in the figures, particularly FIGS. 2, 3, 4, 8, and 9, the ring portions are shown with the ramp surface and the threaded portion as part of a single integral ring portion. It is also contemplated and ring portion is defined to include embodiments where such ring portion is, for example, more than a single unit. Referring to FIG. 3, the dotted lines with the element number 116 illustrate that the ring portion can be two components, with one component having the circumferential ramp surface and the other component having the threaded portion. This type of configuration could minimize the torque provided on the second end of the tube portion as the ring portion is rotated and tightened on the nozzle or base sleeve portion.

Figures 10, 11:
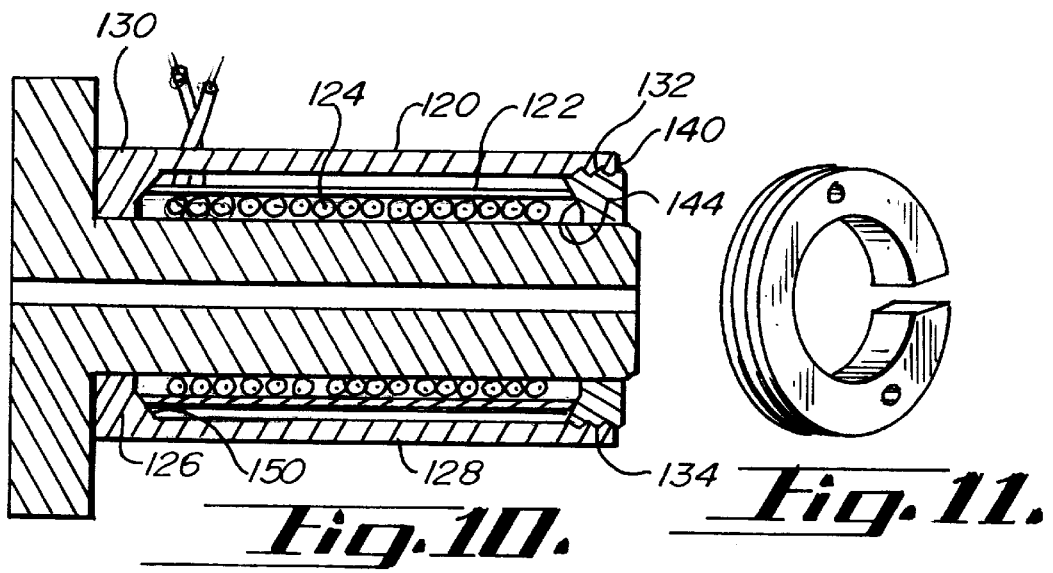
FIG. 10 is a cross-sectional view of a further embodiment of the invention utilizing an exterior base sleeve.
FIG. 11 is a split interior nut arrangement suitable for the embodiment of FIG. 10.
Figure 12:
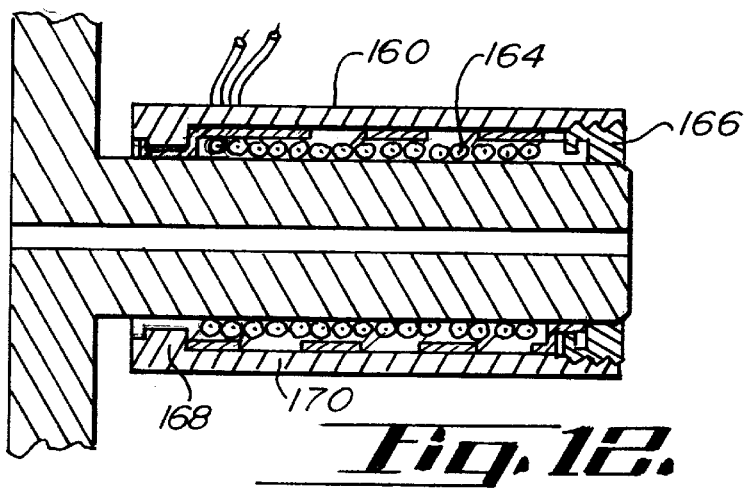
FIG. 12 is a cross-sectional view of a further embodiment of the invention utilizing a tube portion that compresses radially as it is axially extended.
Figures 13, 14:
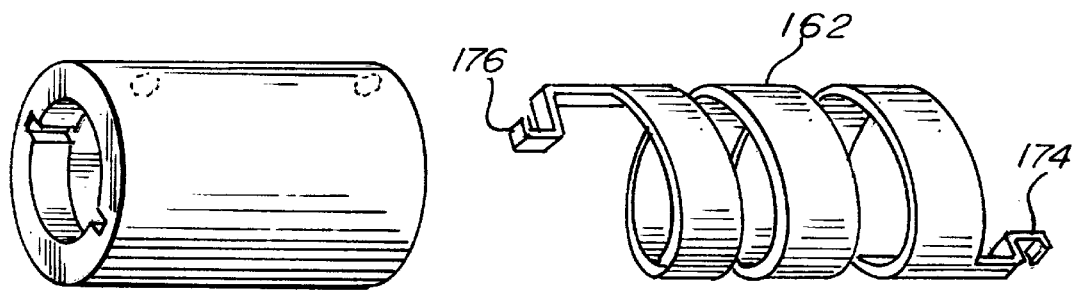
FIG. 13 is a perspective view of the base sleeve of FIG. 12.
FIG. 14 is a perspective view of a further embodiment of a tube portion.

Referring to FIGS. 10 and 14, further embodiments are illustrated utilizing a base sleeve which is exterior to the tube portion with respect to the nozzle. FIG. 10, the heater generally comprises a base sleeve 120, a first tube portion 122 and a coiled heater element 124. The second ring portion 126 is integral with the base sleeve portion 128. The base sleeve has the second ring portion 126 at its base end 130 and has a threaded portion 132 at its tip end 134. The first ring portion has a cooperating threaded surface 140 as well as a ramp surface 144. Both the threaded portion 132 and the base sleeve 120 and the threaded portion on the first ring portion may be tapered where a slit such as shown in FIG. 11A is provided such that the first ring portion is compressed onto the nozzle as it is turned inwardly with respect to the base sleeve 120. The second ring portion also has a ramp surface 150 which engages one edge of the tube portion. This embodiment provides the advantage of having the coiled heater element compressed directly on the nozzle as opposed to separating the heater element from the nozzle by way of the base sleeve portion as shown in the embodiment of FIG. 9.

Referring to FIGS. 12, 13, 14, 15, 16, and 17, a further embodiment of a heater clamp according to the invention is shown. This embodiment comprises a base sleeve 160, a tube portion 162, coiled heater element 164 and a first ring portion 166. The second ring portion 168 is integral with the base sleeve portion 170 to form the base sleeve. In this embodiment, the tube portion 162 has a first anchoring member configured as a tab 174 and a second anchoring member configured as a second tab 176 which attach to the first ring member 166 and the second ring member 168 respectively. This embodiment differs from the previous embodiments in that the compression of the coiled heater element radially inward is provided by an axial lengthening of the tube portion provided by an axially force outward. This compares to the compression of the tube portion provided by an axial compression by ramp members which compress the tube portion in the previously described embodiments. FIGS. 13, 15, 16, and 17, show details of the respective components of this embodiment.

Referring to FIGS. 18, 19, and 20, a further embodiment of the invention is shown and generally comprises a tube portion 190, a first ring portion 192 and a second ring portion 194. The first ring portion 192 is comprised of a compressing member 196 and a tightening member 198. The compressing member 196 has a pair of ramps 202, 204. The tightening member 198 has a threaded portion 210 which engages with the thread on the nozzle or on a separate base sleeve (not shown for this particular embodiment). The second ring portion 194 also has a pair of ramp surfaces 216, 218. The tube portion shown in isolation in FIG. 20 has tapered surfaces 230, 232, 234, 236 which cooperate with the ramps on the ring portions. This embodiment functions as follows: The second ring member 194 is put on the nozzle followed by the coiled heater element 250 which is covered by the tube portion 190. The first ring portion 192 is then engaged with the tube portion and a nut is secured to axially compress the tube ring portions with respect to each other. This causes the ramp surfaces 202, 204, 216, 218 to impart a compressive tangential force on the tabs 262, 264, 266, 268 of the tube portion thereby decreasing the diameter of said tube and compressing the tube radially inward on the heater element 250, thus compressing the heater element on the nozzle. The dashed lines in FIG. 18 enumerated 230, 232 show the potential positioning of an additional ramp surface which can provide simultaneous inward radial compression of the tabs as they are being forced circumferentially together.

It should be noted that this embodiment utilizes the ramp structure positioned at the ends of the tube as do the other embodiments, however, the embodiment operates by providing the compressing force at a more restricted area then in the previous embodiments. Also, it is evident that this particular embodiment could be combined with the other embodiments such that the rate tangential compressive force is provided as well as the circular compressive radially forces as shown in the earlier embodiments.

Figure 21:
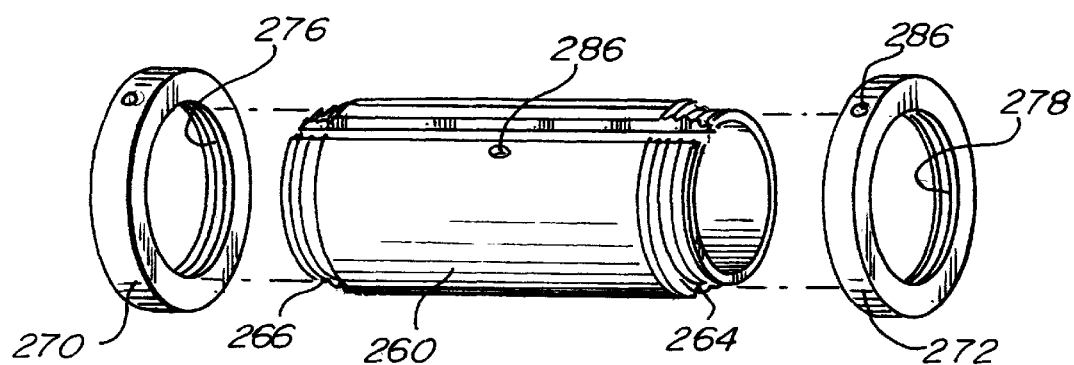
FIG. 21 is a perspective view of a further heater clamp embodiment.

Referring to FIG. 21 a further embodiment of a heater clamp is shown. This embodiment has a slit cylindrical tube 260 with a pair of frusto conical threaded portions 264, 266 and a pair of nuts 270, 272. The nuts would appropriately also have frusto conically shaped threaded portions 276, 278. Gripping means 282, such as holes 286 or hex faces, knurling or the like can be utilized to secure a components as a cooperating component is engaged and tightened thereto. Although the frusto conical threaded portions are shown at the ends of the slit cylindrical tubing, such portion could also be position intermediate, i.e. at the middle of the tubing.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A heater clamp for attachment to a plastic injection molding nozzle and for securing to the nozzle a coiled metallic sheath with a heater element therein, the nozzle having a tip end with threads thereon and an opposite base end, the clamp comprising:
   a) a tube portion with a first end with a first end edge and a second end with a second end edge, the tube sized to extend around the coiled metallic sheath, a slit extending from the first end toward the second end whereby the tube can be flexed radially inward,
   b) a first ring portion having a first conical surface and a threaded portion, the ring portion engageable with the threads at the tip end of the nozzle whereby the conical surface substantially faces the base portion of the nozzle, the ring moving axially with respect to the nozzle as it rotates when engaged with the threads,
   c) a second ring portion having a second conical surface positionable opposite the first ring portion at the base portion, whereby with the tube placed intermediate the first ring portion and the second ring portion and with the coiled metallic sheath on the nozzle, the tube is radially compressible by tightening the first ring portion thereby forcing the coiled metallic sheath onto the nozzle.

2. The heater clamp of claim 1 wherein the second ring portion is rotatable with respect to the nozzle.

3. The heater clamp of claim 1 wherein the second ring portion is integral with respect to the nozzle.

4. The heater clamp of claim 1 wherein the slit extends from the first end edge to the second end edge.

5. The heater clamp of claim 1 wherein the tube portion has a plurality of slits extending in a generally axial direction from the first end edge.

6. The heater clamp of claim 5 wherein the tube portion has a plurality of slits extending in a generally axial direction from the second end edge.

7. The heater clamp of claim 1 wherein the first end edge and the second end edge are conically shaped to correspond with the first conical surface and the second conical surface respectively.

8. A heater for attachment to a plastic injection mold nozzle, the nozzle having a base portion and a tip portion, the heater comprising:
   a) a base sleeve placeable over the nozzle, the base sleeve having a first end, an opposite second end, and an intermediate portion, the first end having a first inclined surface leaning toward said intermediate portion, the second end having threads;
   b) a ring member having a threaded portion engageable with the threads of the base sleeve opposite the first end of said base sleeve and having a second inclined surface angled toward said intermediate portion, the ring member moveable axially on said base sleeve as the ring member is rotated whereby the inclined surfaces may approach and retract with respect to each other;
   c) a metallic sheath formed to fit over the nozzle, the metallic sheath enclosing a heater element wire;
   d) a slit tube extending intermediate the two conical surfaces and engageable with said conical surface, the slit tube extending around the coiled metallic sheath whereby when the opposing angled surface are moved together, the slit tube is forced radially inward thereby forcing the coiled metallic sheath toward the nozzle.

9. The heater of claim 8 wherein the base sleeve is positioned radially exterior to the slit tube.

10. The heater of claim 8 wherein the base sleeve is positioned radially interior to the slit tube.

11. A heater for attachment to a plastic injection molding nozzle, the nozzle having a tip end with threads thereon and an opposite base end, the heater comprising:
   a) a metallic sheath formed to fit over the nozzle, the metallic sheath enclosing a heater element wire;
   b) a tube portion with a first end with a first end edge and a second end with a second end edge, the tube sized to extend around the metallic sheath, a slit extending from the first end toward the second end whereby the tube can be flexed radially inward, a pair of tabs on the first end edge opposite one another with respect to the slit, and a pair of tabs on the second end edge opposite one another with respect to the slit;
   c) a first ring portion comprising a compressing portion and a tightening portion, the compressing portion having a pair of ramp surfaces to engage the pair of tabs on the first end edge, the tightening portion engageable with the nozzle's first conical surface and a threaded portion, the ring portion engageable with the threads at the tip end of the nozzle, the ring portion moving axially with respect to the nozzle as tightening portion rotates when engaged with the threads, and
   d) a second ring portion having a second pair of ramps, the second ring portion positionable at the base end of the nozzle opposite the first ring portion at the base portion, whereby with the tube placed intermediate the first ring portion and the second ring portion and with the coiled metallic sheath on the nozzle, the tube is radially compressible by tightening the tightening portion thereby forcing the coiled metallic sheath onto the nozzle.

12. The heater of claim 11 wherein the pair of ramps provide force on the tabs in a tangential inward direction.

13. The heater of claim 12 wherein the ramps also provide inward radial force on the tabs.

14. A heater clamp for tightening around a shaped metallic heater sheath, the clamp comprising a slit cylindrical tube to circumferentially engage the shaped metallic sheath, threaded portion, and a nut to tighten on said threaded portion, and a means for radially compressing inwardly the slit cylindrical tube as the nut is tightened.

15. The heater clamp of claim 14 wherein the threaded portion is frusto conical and is integral with the slit tube portion.

* * * * *